United States Patent
Kothari et al.

(10) Patent No.: US 8,650,633 B2
(45) Date of Patent: Feb. 11, 2014

(54) INTEGRATED CIRCUIT FOR PREVENTING CHIP SWAPPING AND/OR DEVICE CLONING IN A HOST DEVICE

(75) Inventors: Love Kothari, Sunnyvale, CA (US); Paul Chou, Santa Clara, CA (US)

(73) Assignee: Broadcom Corporation, Irvine, CA (US)

(*) Notice: Subject to any disclaimer, the term of this patent is extended or adjusted under 35 U.S.C. 154(b) by 3 days.

(21) Appl. No.: 13/250,529

(22) Filed: Sep. 30, 2011

(65) Prior Publication Data

US 2013/0047272 A1 Feb. 21, 2013

Related U.S. Application Data

(60) Provisional application No. 61/524,538, filed on Aug. 17, 2011.

(51) Int. Cl.
*G06F 21/00* (2013.01)

(52) U.S. Cl.
USPC .................................. 726/16; 726/34; 713/189

(58) Field of Classification Search
None
See application file for complete search history.

(56) References Cited

U.S. PATENT DOCUMENTS 6,253,076 B1 *  6/2001  Boesch ......................... 455/420
7,987,358 B1 *  7/2011  Walstrum et al. ............. 713/160
2006/0026690 A1 *  2/2006  Yu et al. ........................... 726/27
2006/0202232 A1 *  9/2006  Takami .......................... 257/209
2008/0222581 A1 *  9/2008  Banerjee et al. ................... 716/4

OTHER PUBLICATIONS

Alkabani et al.; Active Control and Digital Rights MAnagement of Integrated Circuit IP Cores; Oct. 24, 2008; ACM; pp. 227-233.*

* cited by examiner

*Primary Examiner* — Gilberto Barron, Jr.
*Assistant Examiner* — Malcolm Cribbs
(74) *Attorney, Agent, or Firm* — Sterne, Kessler, Goldstein & Fox PLLC

(57) ABSTRACT

An integrated circuit is disclosed that can be included in a host electronic device that can be commonly manufactured, where the integrated circuit can be designated ("locked") for a specific manufacturer, thereby substantially reducing the likelihood that a third party will be able to successfully clone a host electronic device manufactured by the specific manufacturer and/or swap the chip containing the integrated circuit for one having more enabled features. The integrated circuit includes an ID module that can be programmed after fabrication. Components within the integrated circuit designate manufacturer-specific configurations (e.g., address mapping, pin routing and/or vital function releasing) based on the programmed manufacturer ID. As a result, once the integrated circuit has been programmed with the manufacturer ID, the integrated circuit will function correctly only within a host device manufactured by the manufacturer associated with the programmed manufacturer ID.

19 Claims, 7 Drawing Sheets

INTEGRATED CIRCUIT FOR PREVENTING CHIP SWAPPING AND/OR DEVICE CLONING IN A HOST DEVICE

CROSS-REFERENCED TO RELATED APPLICATIONS

This patent application claims the benefit of U.S. Provisional Patent Application No. 61/524,538, filed Aug. 17, 2011, entitled "Power Management Unit," which is incorporated herein by reference in its entirety.

BACKGROUND

1. Field of Invention

The invention relates to an electronics device, and more specifically relates to an integrated circuit that is incorporated into a host electronic device that is capable of being commonly manufactured, but restricting the integrated circuit's use to a particular manufacturer, thereby preventing chip swapping and/or device cloning.

2. Related Art

The popularity of certain electronics devices has substantially increased over the past several years, including that of cellular phones and mobile tablet computers. However, such devices are also typically expensive and restrict access to certain device features that are only unlocked after payment of subscription and/or service fees.

In order to cheaply gain access to these devices, some consumers and vendors have begun to "clone" devices for much less money than the cost of actually purchasing the device from the branded original equipment manufacturer (OEM). For example, a counterfeit vendor can purchase each of the components of a branded OEM cellular telephone directly from the manufacturers of those components, from other companies who use similar components, or from other devices that use the same components. The vendor can then assemble a phone using those components that appears and functions nearly identical to the branded OEM phone. The vendor will then market the phone as the true branded OEM phone, but at a lower price than an actual branded OEM phone, and with none of the profits being given to OEM.

Similarly, in order to gain access to the full capabilities and features a particular device has to offer, consumers and some foreign countries have also begun performing "chip swapping." Using the above example, a certain chip within the branded OEM phone may include the functionality to perform several functions, but restricts access to certain ones of those functions that have not been paid for. The counterfeit vendor can acquire replacement chips from chip manufacturers or from other devices that have those features enabled. The retailer can then "swap" out (i.e., replace) the chip included in the OEM phone with the acquired replacement chip. The device will then perform many functions for free that otherwise would require additional fees.

These practices of device cloning and chip-swapping cost OEM millions of dollars in annual revenue, which ultimately reduces the manufacturers' budgets for developing new and more advanced technologies. Thus, there is a need for a chip that can be inexpensively manufactured, but which can hinder chip-swapping and device cloning. Further aspects and advantages of the invention will become apparent from the detailed description that follows.

BRIEF DESCRIPTION OF THE DRAWINGS/FIGURES

Embodiments of the invention are described with reference to the accompanying drawings. In the drawings, like reference numbers indicate identical or functionally similar elements. Additionally, the left most digit(s) of a reference number identifies the drawing in which the reference number first appears.

Figure 1:
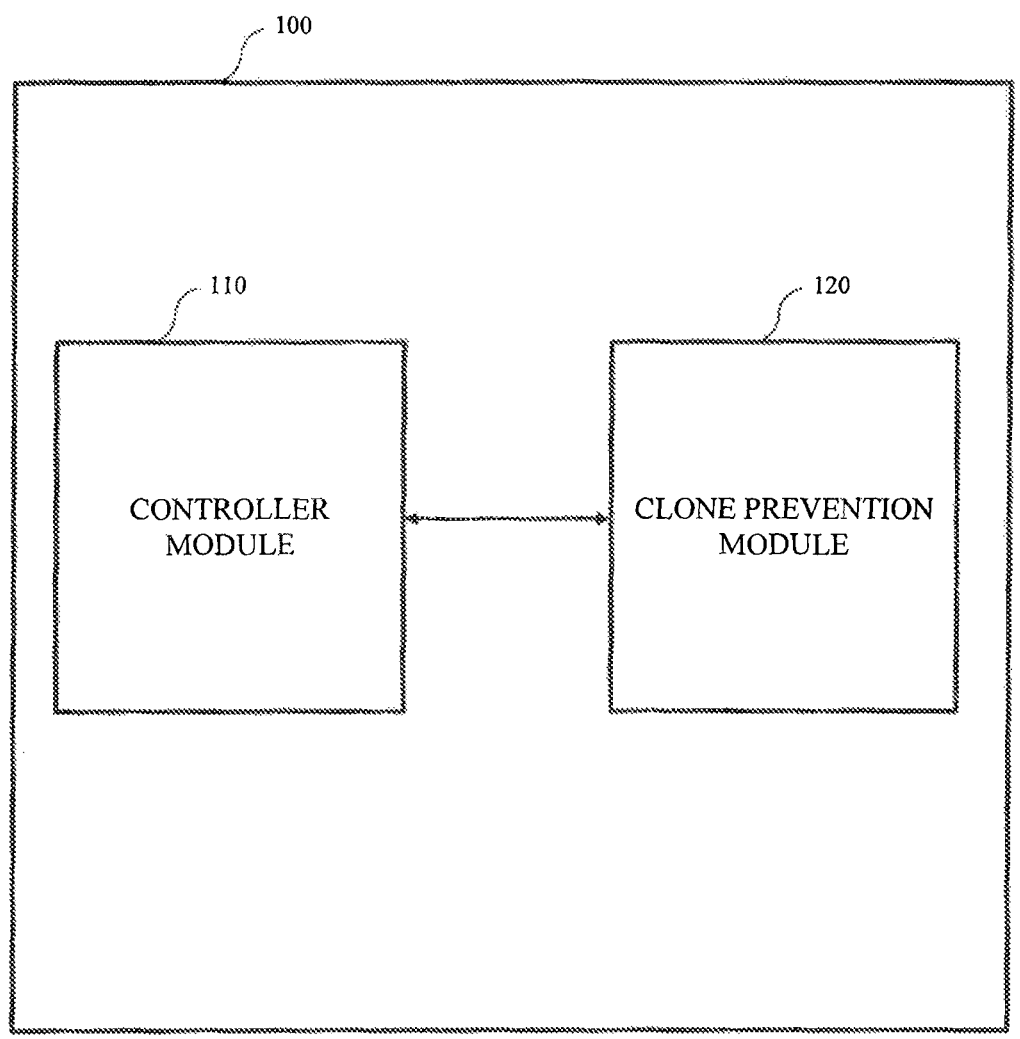
FIG. 1 illustrates a block diagram of an integrated circuit according to an exemplary embodiment of the invention.

The invention will now be described with reference to the accompanying drawings. In the drawings, like reference numbers generally indicate identical, functionally similar, and/or structurally similar elements. The drawing in which an element first appears is indicated by the leftmost digit(s) in the reference number.

DETAILED DESCRIPTION OF THE INVENTION

The following Detailed Description refers to accompanying drawings to illustrate exemplary embodiments consistent with the invention. References in the Detailed Description to "one exemplary embodiment," "an exemplary embodiment," "an example exemplary embodiment," etc., indicate that the exemplary embodiment described may include a particular feature, structure, or characteristic, but every exemplary embodiment may not necessarily include the particular feature, structure, or characteristic. Moreover, such phrases are not necessarily referring to the same exemplary embodiment. Further, when a particular feature, structure, or characteristic is described in connection with an exemplary embodiment, it is within the knowledge of those skilled in the relevant art(s) to affect such feature, structure, or characteristic in connection with other exemplary embodiments whether or not explicitly described.

The exemplary embodiments described herein are provided for illustrative purposes, and are not limiting. Other exemplary embodiments are possible, and modifications may be made to the exemplary embodiments within the spirit and scope of the invention. Therefore, the Detailed Description is not meant to limit the invention. Rather, the scope of the invention is defined only in accordance with the following claims and their equivalents.

Embodiments of the invention may be implemented in hardware (e.g., circuits), firmware, software, or any combination thereof. Embodiments of the invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc.

The following Detailed Description of the exemplary embodiments will so fully reveal the general nature of the invention that others can, by applying knowledge of those skilled in relevant art(s), readily modify and/or adapt for various applications such exemplary embodiments, without undue experimentation, without departing from the spirit and scope of the invention. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

Although several portions of the description of the present invention may be described in terms of wireless devices (specifically cellular devices), those skilled in the relevant art(s) will recognize that the present invention may be applicable to any other devices for which chip-swapping and device cloning are to be prevented without departing from the spirit and scope of the present invention.

An Exemplary Integrated Circuit

FIG. 1 illustrates a block diagram of an integrated circuit 100 according to an exemplary embodiment of the invention. The integrated circuit includes a controller module 110 and a clone prevention module 120 that can be incorporated in a host electronic device (e.g. cellular phone).

The controller module 110 includes all the general functionality of the integrated circuit 100 not related to clone prevention. For example, the controller module 110 can perform RF processing, A/D conversion, and device instruction, among other functions.

The clone prevention module 120 communicates with the controller module 110 and functions to substantially prevent or hinder cloning and chip-swapping of a host electronic device by configuring the integrated circuit 100 to be "manufacturer-specific." Specific operation of the clone prevention module 120 is discussed in further detail below.

1. Address Mapping

Figure 2:
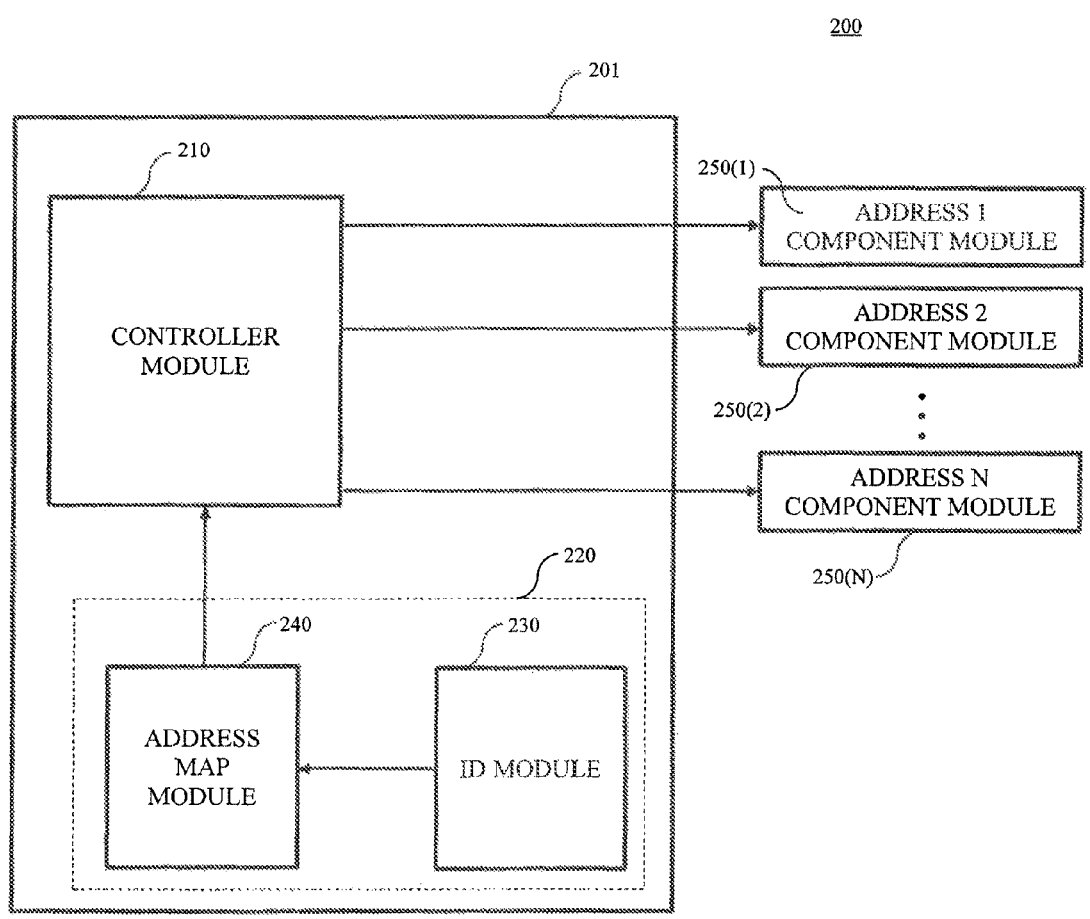
FIG. 2 illustrates a block diagram of an electronics apparatus having an integrated circuit according to an exemplary embodiment of the invention.

FIG. 2 illustrates a block diagram of an electronics apparatus 200 having a plurality of component modules 250 and an integrated circuit 201 according to an exemplary embodiment of the invention. The integrated circuit 201 may represent an exemplary embodiment of the integrated circuit 100, and includes a clone prevention module 220. The clone prevention module 220 may represent an exemplary embodiment of the clone prevention module 120, and includes an ID module 230 and an address map module 240.

The integrated circuit 201 communicates with the plurality of component modules 250 located at various addresses within the electronics apparatus 200. For example, the electronics apparatus 200 includes N component modules 250(1)-250(N), where N>0. A first component module 250(1) is located at a first address within the electronics apparatus 200 and a second component module 250(2) is located at a second address within the electronics apparatus 200.

A controller module 210 communicates with the component modules 250. However, the addresses of the component modules 250 vary by manufacturer (e.g., original equipment manufacturer [OEM]). For example, a USB module may be located at address 1 within an OEM-A device, but at address N within an OEM-B device. Therefore, the controller module 210 must first determine the addresses of the component modules 250 before initiating communication with the component modules in order to avoid faulty device operation.

The address map module 240 stores address maps for each of a plurality of OEMs. Although devices among different OEMs may include many of the same component modules 250, those component modules 250 will have different addresses in different OEM devices. Therefore, each address map identifies the respective addresses for those component modules 250 within a particular OEM device. Using the above example, the address map associated with an OEM-A device will identify the address of the USB as address 1, whereas the address map associated with an OEM-B device will identify the address of the USB as address N.

Although the address map module 240 stores address maps for many manufacturers, the address map module only selects a single one of the address maps to be used by the integrated circuit 201, for a given host device (e.g. cell phone). The address map module 240 sets the address map based on an OEM ID.

The ID module 230 included in the clone prevention module 220 is programmed to store the OEM ID corresponding to an original OEM purchaser of the integrated circuit 201, such as a host device OEM manufacturer. The ID module 230 is preferably a programmable read-only memory (PROM) or one-time programmable circuit (OTP) that is capable of being programmed with information only once. In addition, the ID module is preferably capable of being programmed after fabrication of the integrated circuit 201, and is left un-programmed throughout fabrication. This allows for the repeated manufacturing of a "blank" chip, which is useable by a plurality of intended OEMs. The ID module 230 can then later be programmed for a specific OEM after the specific OEM places an order for the chip. This allows chips to be designated for particular OEM without fabricating a different chip for each one, thereby substantially reducing manufacturing costs.

After the ID module 230 has been programmed with the OEM ID, the address map module 240 acquires the OEM ID from the ID module 230 and selects an address map based on the OEM ID. Once the address map module 240 has set the address map for the integrated circuit 201, the controller module 210 communicates with off-chip components using the selected address map. Using the above example, if the ID module 230 has been programmed with OEM-A OEM ID, the controller module 210 determines the USB to be located at address 1 and directs communications for the USB to that address.

With this configuration, the integrated circuit 201 can be "locked" to a particular OEM's device. Specifically, chips ordered by a specific OEM can be programmed with that OEM's ID. The chip will then automatically alter its address map to correspond to that OEM's specifications. As a result, attempting to use the chip in a cloned phone of another manufacturer will operate improperly because the chip will maintain an address map of the originally intended OEM. In other words, if the chip has been programmed with a OEM-A OEM ID, the chip will not work in a cloned OEM-B host device because it will attempt to communicate with device components located at OEM-A's addresses, rather than at OEM-B's addresses, which will cause faulty device operation within the cloned device, thereby preventing device cloning. For the same reason, the chip will also protect against chip-swapping because a chip programmed for a OEM-A host device will only be replaceable with another OEM-A programmed chip, as the device will not function properly if replaced with a chip programmed for another manufacturer.

Those skilled in the relevant art(s) will recognize that numerous modifications may be available to this exemplary integrated circuit within the spirit and scope of the present invention. For example, the address map module 240 may set the address map using a simple look-up table or hash scheme, or may use the OEM ID as a key for decrypting a corresponding encrypted address map.

Another Exemplary Integrated Circuit

Figure 3:
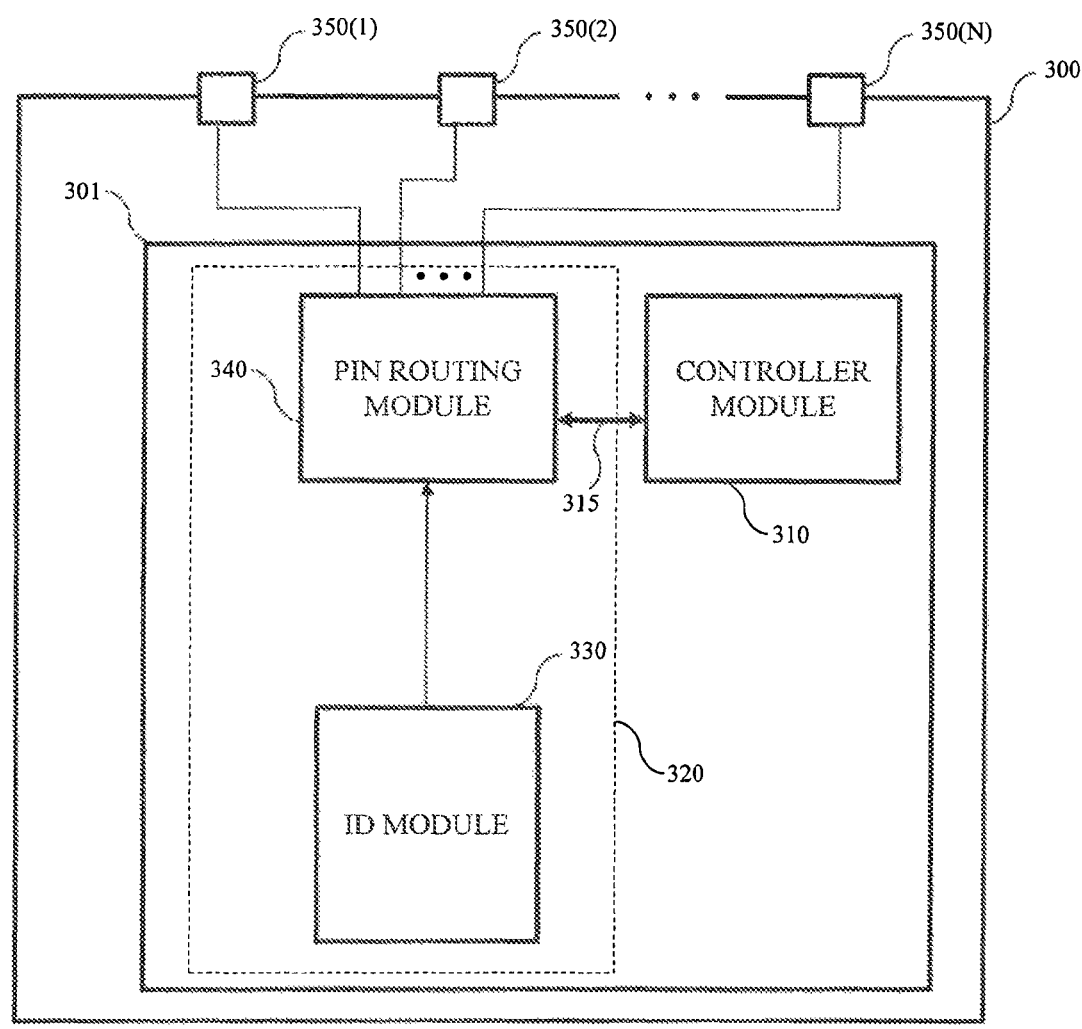
FIG. 3 illustrates a block diagram of a microchip having an integrated circuit according to an exemplary embodiment of the invention.

FIG. 3 illustrates a block diagram of a microchip 300 having an integrated circuit 301 according to an exemplary embodiment of the invention. The integrated circuit 301 includes a clone prevention module 320 and may represent an exemplary embodiment of the integrated circuit 100. The clone prevention module 320 includes an ID module 330 and a pin routing module 340, and may represent an exemplary embodiment of the clone prevention module 120.

The microchip 300 includes a plurality of pins 350 disposed along its outer surface that connect off-chip components to the integrated circuit 301. The integrated circuit 301 includes a controller module 310 that includes nearly all the functional components, and performs nearly all of the functional operations, of the integrated circuit 301 unrelated to clone prevention. The controller module 310 communicates with off-chip components via one or more of the plurality of pins 350. Those skilled in the relevant art(s) will recognize that each pin 350 can represent a single pin, or may represent a pin bank that includes multiple individual pins. Further, although the pins 350 are discussed as being the physical pins of the microchip, the pins can also constitute contacts on the integrated circuit for the connecting the integrated circuit to the physical pins.

The controller module 310 sends and receives signals with the plurality of pins 350 via the pin routing module 340. The controller module transfers signals between the pin routing module 340 on a signal bus 315. The signal bus 315 may be one or more signal busses and/or individual signal lines.

The pin routing module 340 receives an OEM ID from the ID module 330 that identifies an OEM associated with the integrated circuit 301. Based on the received OEM ID, the pin routing module 340 routes signals between the controller module 310 and the plurality of pins 350. In other words, the pin routing module 340 designates the pins to which signals received from the controller module 310 should be directed, and routes those signals accordingly. In addition, the pin routing module 340 may also route signals from the plurality of pins 350 to proper portions of the controller module 310.

For example, the microchip 300 may include N pines 350 that are capable of being configured to transmit/receive different signals, where N>0. If the OEM ID identifies OEM-A as the OEM, the pin routing module 340 may route USB signals to pin 350(1) and High-Definition Multimedia Interface (HDMI) signals to pin 350(2). On the contrary, if the OEM ID identifies OEM-B as the OEM, the pin routing module 340 may route USB signals to pin 350(N) and HDMI signals to pin 350(1).

The pin routing module 340 may include one or more individual switching elements and/or multiplexers for routing the signals. For example, the multiplexers can be configured to select signal inputs using the OEM ID as a selection address. Alternatively, the OEM ID may be used to select the selection address from a look-up table, or may act as a key for decrypting an encrypted selection address.

With this configuration, the integrated circuit 301 can be "locked" to a particular OEM. In particular, each OEM using the chip can be designated with its own unique pin configuration. These pin configurations can then be programmed into the pin routing module 340 in association with the OEM IDs of their corresponding OEMs. Therefore, once the integrated circuit has been ordered by a specific OEM and the ID module 330 has been programmed with the corresponding OEM ID, the integrated circuit will be "locked" to that particular OEM. Thus, the microchip 300 will protect against device cloning because an OEM-A programmed integrated circuit 301 would only properly route signals within an OEM-A host device, and would otherwise transmit signals to incorrect pins. For the same reason, the microchip 300 would protect against chip-swapping because a OEM-A programmed chip could only be substituted for another OEM-A programmed chip that maintains all the same function restrictions as the original chip.

Those skilled in the relevant art(s) will recognize that many modifications may be available to the microchip 300. For example, the pins 350 may be located along multiple sides of the chip 300. In addition, some of the pins 350 may be set to a particular function, and therefore may be incapable of being modified based on OEM ID.

Another Exemplary Integrated Circuit

Figure 4:
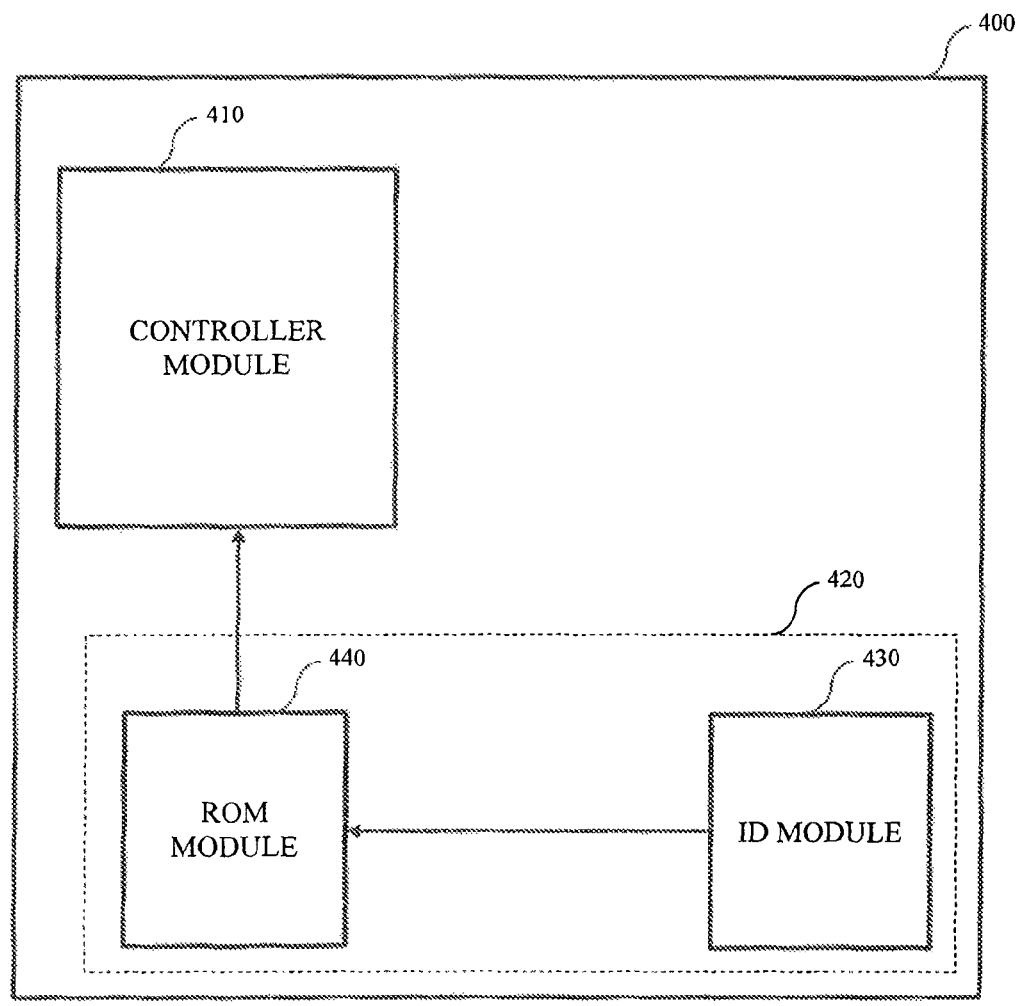
FIG. 4 illustrates an integrated circuit according to an exemplary embodiment of the invention.

FIG. 4 illustrates an integrated circuit 400 according to an exemplary embodiment of the invention. The integrated circuit 400 includes a clone prevention module 420 and may represent an exemplary embodiment of the integrated circuit 100. The clone prevention module 420 includes an ID module 430 and a ROM module 440, and may represent an exemplary embodiment of the clone prevention module 120.

The integrated circuit 400 includes a controller module 410 that includes all the functional components, and performs all of the functions, of the integrated circuit 400 unrelated to clone prevention. In order to perform many of these functions, the controller module 410 must access programming codes, such as application programming interfaces (APIs). An API is a particular set of rules and specifications that the controller module 410 must follow in order to communicate with other system components. The API serves as an interface between different components and facilitates their interaction. An API can define "vocabularies" and resources request conventions, and may include specifications for routines, data structures, object classes and protocols used to communicate between the components. As such, APIs are integral to the proper operation of a device.

APIs for each OEM are stored in the ROM module 440. The ROM module 440 "hides" the APIs of each OEM until an OEM ID is received from the ID module 430. The ROM module 440 may hide the APIs using any known technique, including data encryption and access restrictions, among others.

The ROM module 440 receives the OEM ID from the ID module 230. After receiving the OEM ID, the ROM module 440 releases ("unhides") APIs corresponding to the OEM associated with the OEM ID. The controller module 410 can then gain access to the OEM's APIs in order to adequately and accurately perform its various functions.

In an embodiment, the ROM module 440 may constitute a boot ROM that includes boot programs for each of the OEMs, instead of, or in addition to, the APIs. Boot programs define the start-up operations of a device and/or device components, and may include setting values into registers and initiating code sequences or component start-ups. When configured as a boot ROM, the ROM module 440 preferably maintains separate regions, each region containing the boot programs of a single OEM. With this configuration, the ROM module 440 can hide or release entire regions of its memory depending on the received OEM ID.

In either of the above scenarios, the ROM module 440 will only release the vital operation information associated with an OEM that corresponds to the OEM ID received from the ID module 430. Thus, for example, if an OEM-A host device is cloned to include an OEM-B programmed chip, the OEM-A host device will attempt to run the APIs and/or boot programs released by the ROM module 440. However, because those programs relate to an OEM-A host device, the OEM-B clone will malfunction. As a result, the integrated circuit 400 protects against device cloning because vital OEM-specific programs will only be useful for a device manufactured by the OEM whose OEM ID has been programmed into the ID module 430. For the same reason, the integrated circuit 400 protects against chip-swapping because an OEM's device will be unable to access its vital OEM-specific programs from a chip substituted into the device that is programmed for another OEM device, as its programs will remain hidden within the ROM module 440.

Those skilled in the relevant art(s) will recognize that many modifications may be available to the integrated circuit 400. For example, the ROM module 440 may include any OEM-specific information necessary for proper device functionality, provided that the information remains hidden until a corresponding OEM ID has been programmed into the ID module 430.

Those skilled in the relevant art(s) will also recognize that the above-discussed clone prevention modules are not mutually exclusive of one another. Instead, an integrated circuit can be fabricated to include any combination of the above-discussed clone prevention modules. For example, a single integrated circuit may include an address map module, a pin routing module, and a ROM module that are all connected to a single ID module. In this manner, the security of the integrated circuit can be even further enhanced, thereby further protecting against device cloning and chip-swapping.

An Exemplary Method of Protecting Against Chip-Swapping and/or Device Cloning

Figure 5:
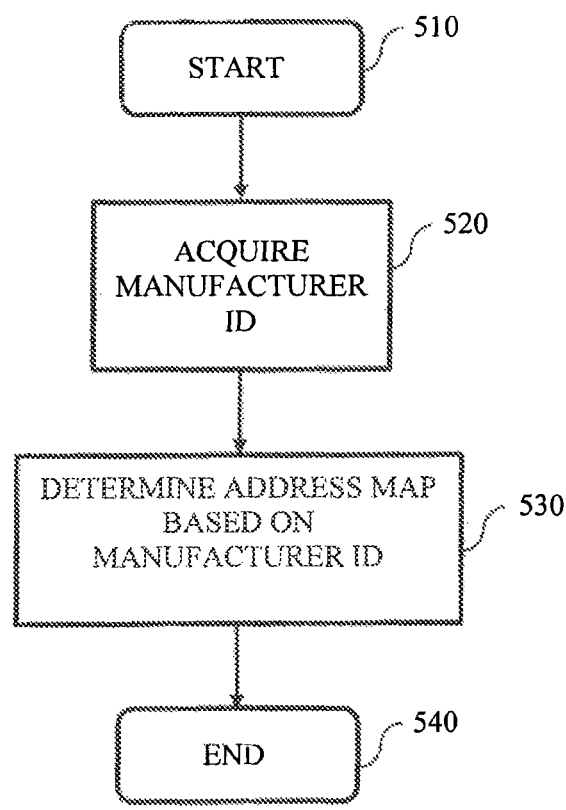
FIG. 5 illustrates a block diagram of a method for preventing chip swapping and/or device cloning according to an exemplary embodiment of the invention.

FIG. 5 illustrates a block diagram of a method for preventing chip swapping and/or device cloning within an integrated circuit according to an exemplary embodiment of the invention.

The method begins at step 510 and immediately proceeds to step 520. In step 520, the integrated circuit acquires an OEM ID that identifies an OEM for which the integrated circuit has been designated. The method then proceeds to step 530. In step 530, the integrated circuit determines an address map based on the OEM ID. The address map may be determined by applying the OEM ID to a lookup table, or by using the OEM ID as a decryption key, as well as by any other suitable method within the spirit and scope of the present invention. The method then proceeds to step 540, where the method ends.

Those skilled in the relevant art(s) will recognize that the above method can additionally or alternatively include any of the functionality of the integrated circuit 201 discussed above, as well as any of its modifications. Further, the above description of the exemplary method should neither be construed to limit the method nor the description of the integrated circuit 201.

An Exemplary Method of Protecting Against Chip-Swapping and/or Device Cloning

Figure 6:
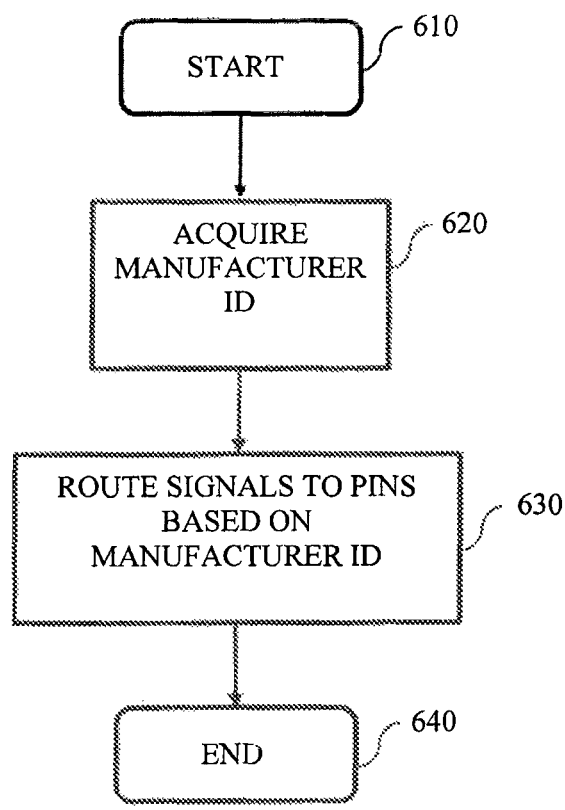
FIG. 6 illustrates a block diagram of a method for preventing chip swapping and/or device cloning according to an exemplary embodiment of the invention.

FIG. 6 illustrates a block diagram of a method for preventing chip swapping and/or device cloning within a microchip having an integrated circuit according to an exemplary embodiment of the invention.

The method begins at step 610 and immediately proceeds to step 620. In step 620, the integrated circuit acquires an OEM ID that identifies an OEM for which the integrated circuit has been designated. The method then proceeds to step 630. In step 630, the integrated circuit routes signals for transmission to off-chip components to pins located on the microchip based on the OEM ID. In other words, the integrated circuit designates certain signals for specific pins on the microchip, depending on the acquired OEM ID. The method then proceeds to step 640, where the method ends.

Those skilled in the relevant art(s) will recognize that the above method can additionally or alternatively include any of the functionality of the integrated circuit 301 discussed above, as well as any of its modifications. Further, the above description of the exemplary method should neither be construed to limit the method nor the description of the integrated circuit 301.

An Exemplary Method of Protecting Against Chip-Swapping and/or Device Cloning

Figure 7:
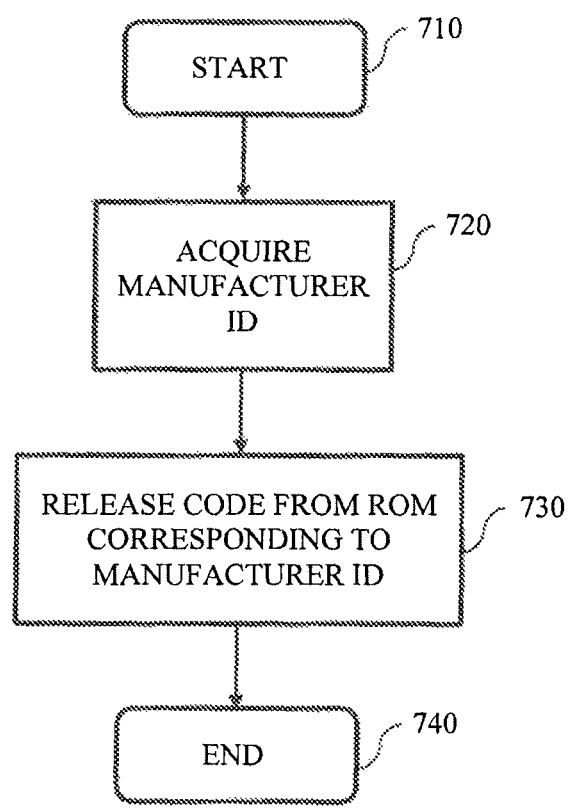
FIG. 7 illustrates a block diagram of a method for preventing chip-swapping and/or device cloning according to an exemplary embodiment of the invention.

FIG. 7 illustrates a block diagram of a method for preventing chip swapping and/or device cloning within an integrated circuit according to an exemplary embodiment of the invention.

The method begins at step 710 and immediately proceeds to step 720. In step 720, the integrated circuit acquires an OEM ID that identifies an OEM for which the integrated circuit has been identified. The method then proceeds to step 730. In step 730, the integrated circuit releases a specific or vital program relating to the functionality of a device manufactured by the OEM corresponding to the OEM ID. The vital program may be, for example, an API or a boot code. The method then proceeds to step 740, where the method ends.

Those skilled in the relevant art(s) will recognize that the above method can additionally or alternatively include any of the functionality of the integrated circuit 400 discussed above, as well as any of its modifications. Further, the above description of the exemplary method should neither be construed to limit the method nor the description of the integrated circuit 400.

Those skilled in the relevant art(s) will also recognize that the above methods are not mutually exclusive and may be employed in any combination with one another.

CONCLUSION

It is to be appreciated that the Detailed Description section, and not the Abstract section, is intended to be used to interpret the claims. The Abstract section may set forth one or more, but not all exemplary embodiments, of the invention, and thus, are not intended to limit the invention and the appended claims in any way.

The invention has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

It will be apparent to those skilled in the relevant art(s) that various changes in form and detail can be made therein without departing from the spirit and scope of the invention. Thus the invention should not be limited by any of the above-described exemplary embodiments, but should be defined only in accordance with the following claims and their equivalents.

What is claimed is:

1. An integrated circuit that is included in a host electronic device, comprising:
a plurality of pins;
a controller module configured to communicate with one or more off-chip electronics components via the plurality of pins; and
a clone prevention module configured to lock the integrated circuit to a specific manufacturer of the host electronic device, the clone prevention module including:
an addressing module configured to set at least one of an electronics component address and a pin configuration based on a manufacturer identification (ID) so as to route signals between the controller module and the plurality of pins based on the manufacturer ID.

2. The integrated circuit of claim 1, wherein the clone prevention module is capable of being programmed to lock the integrated circuit to the specific manufacturer after fabrication of the integrated circuit has been completed.

3. The integrated circuit of claim 1, wherein the clone prevention module includes an ID module configured to store the manufacturer ID associated with the specific manufacturer.

4. The integrated circuit of claim 3, wherein the addressing module is an address map module configured to set an address map that defines the electronics component address based on the manufacturer ID stored in the ID module.

5. The integrated circuit of claim 4, wherein the address map module stores, in a memory module, encrypted address maps corresponding to a plurality of possible manufacturers, and
wherein the address map module selects the address map by using the manufacturer ID as a decryption key for decrypting an encrypted address map corresponding to the specific manufacturer.

6. The integrated circuit of claim 4, wherein the address map identifies addresses of electronics components within the host electronic device of the specific manufacturer.

7. The integrated circuit of claim 5, further comprising a controller module configured to communicate with the electronics components based on the address map set by the address map module.

8. The integrated circuit of claim 1, wherein the addressing module determines from the manufacturer ID that a first off-chip electronics component is connected to a first pin of the plurality of pins within an electronics apparatus of the specific manufacturer, and
wherein the addressing module routes signals sent from the controller module that are designated for the first off-chip electronics component to the first pin.

9. The integrated circuit of claim 1, wherein the addressing module includes a plurality of multiplexers that route the signals using the manufacturer ID as a selection address.

10. The integrated circuit of claim 3, wherein the clone prevention module includes a read-only memory (ROM) module configured to store first data corresponding to the specific manufacturer and second data corresponding to a second manufacturer.

11. The integrated circuit of claim 10, wherein the ROM module hides the first data and the second data, and releases only the first data or the second data based on the manufacturer ID stored in the ID module.

12. The integrated circuit of claim 11, wherein the ROM module releases the first data due to its association with the specific manufacturer based on the manufacturer ID stored in the ID module.

13. The integrated circuit of claim 10, wherein the first data is a first application programming interface (API) and the second data is a second API.

14. An integrated circuit that is included in a host electronic device, comprising:
a clone prevention module configured to lock the integrated circuit to a specific manufacturer of the host electronic device,
wherein the clone prevention module includes an identification (ID) module configured to store a manufacturer ID associated with the specific manufacturer,
wherein the clone prevention module includes a read-only memory (ROM) module configured to store first data corresponding to the specific manufacturer and second data corresponding to a second manufacturer,
wherein the ROM module is a boot ROM,
wherein the first data is a first boot program located in a first region of the boot ROM, and
wherein the second data is a second boot program located in a second region of the boot ROM.

15. The integrated circuit of claim 14, wherein the ROM module hides and releases one of the first region or the second region based on the manufacturer ID stored in the ID module.

16. A method of preventing device-swapping within an integrated circuit, comprising:
reading a manufacturer identification (ID) corresponding to a specific manufacturer from an ID module; and
configuring an operation of the integrated circuit based on the manufacturer ID so as to lock the integrated circuit to the specific manufacturer, the configuring including:
setting at least one of an electronics component address and a pin configuration based on the manufacturer ID;
defining a pin configuration based on the manufacturer ID; and
routing signals from the integrated circuit to a plurality of pins based on the defined pin configuration,
wherein the integrated circuit communicates with the plurality of pins.

17. The method of claim 16, wherein the configuring includes determining an address map based on the manufacturer ID, and
wherein the address map identifies communication addresses of components within a host electronic device of the specific manufacturer.

18. The method of claim 16, wherein the integrated circuit includes a read-only memory (ROM) that stores first data corresponding to the specific manufacturer and second data corresponding to a second manufacturer, and
wherein the configuring includes releasing only the data corresponding to the specific manufacturer based on the manufacturer ID.

19. A method of preventing device-swapping within an integrated circuit, comprising:
reading a manufacturer identification (ID) corresponding to a specific manufacturer from an ID module; and
configuring an operation of the integrated circuit based on the manufacturer ID so as to lock the integrated circuit to the specific manufacturer, the configuring including:
setting at least one of an electronics component address and a pin configuration based on the manufacturer ID; and determining, based on the manufacturer ID, an address map that identifies communication addresses of components within a host electronics device of the specific manufacturer.

* * * * *